United States Patent [19]

Ilich

[11] 4,262,810
[45] Apr. 21, 1981

[54] FRAME STRUCTURE AND METHOD OF MAKING SAME

[76] Inventor: Daniel F. Ilich, 149-44 Cherry Ave., Flushing, N.Y. 11255

[21] Appl. No.: 924,984

[22] Filed: Jul. 17, 1978

[51] Int. Cl.³ .............................................. B42F 15/00
[52] U.S. Cl. .................................... 211/206; 29/509; 211/46; 312/184; 403/234
[58] Field of Search ................. 312/184; 211/189, 162, 211/46, 206, 182; 29/509, 155 R, 155 C; 403/231, 234, 401, 402

[56] References Cited

U.S. PATENT DOCUMENTS

| | | | |
|---|---|---|---|
| 2,106,602 | 1/1938 | Hunter | 29/155 C |
| 3,168,917 | 2/1965 | Bartels | 29/509 X |
| 3,266,496 | 8/1966 | West et al. | 211/162 X |
| 3,805,966 | 4/1974 | Wakeman et al. | 211/182 |
| 3,853,227 | 12/1974 | Filipowski | 211/162 |
| 3,999,663 | 12/1976 | Walter et al. | 211/189 X |
| 4,132,178 | 1/1979 | Mueller et al. | 403/234 X |

FOREIGN PATENT DOCUMENTS 208227   1/1957   Australia ................................ 312/184

Primary Examiner—Francis K. Zugel
Assistant Examiner—Robert W. Gibson, Jr.
Attorney, Agent, or Firm—Arthur T. Fattibene

[57] ABSTRACT

A frame structure and method of making same which includes a pair of similarly constructed end supports which can be readily bent to define an inverted U-shaped member, each having a specified notch configuration formed at the corner portions of the respective U-shaped members for receiving and securing the end portions of opposed side rails for maintaining the end supports in a stable predetermined spaced relationship, and cross rails detachably interconnected between the opposed leg portions of the respective end supports. The method of forming such frame structure includes the steps of forming a notch at spaced intervals along a readily bendable length of a stock material whereby the length of stock material can be readily bent into an inverted U-shaped end support in a manner whereby a side rail is gripped and secured at the bent corners of the end supports, and securing a cross rail between the opposed leg portions of the bent end supports.

17 Claims, 13 Drawing Figures

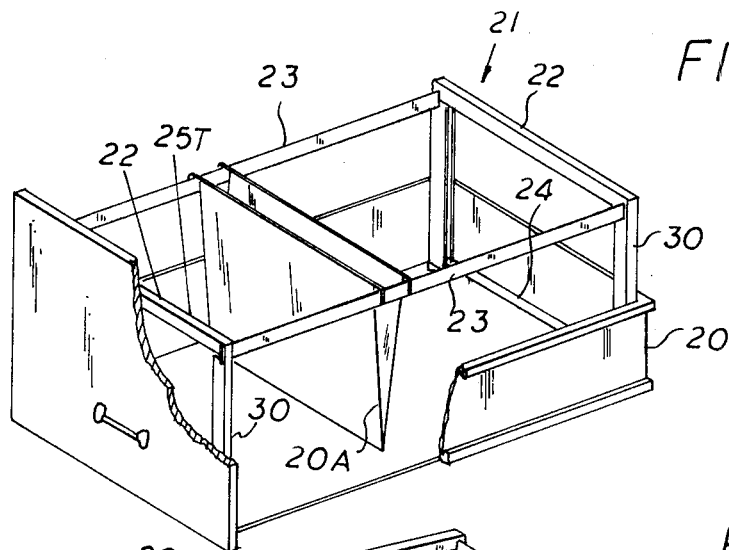
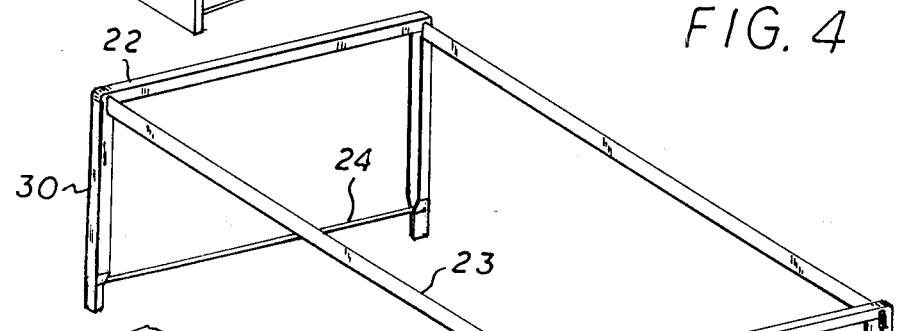
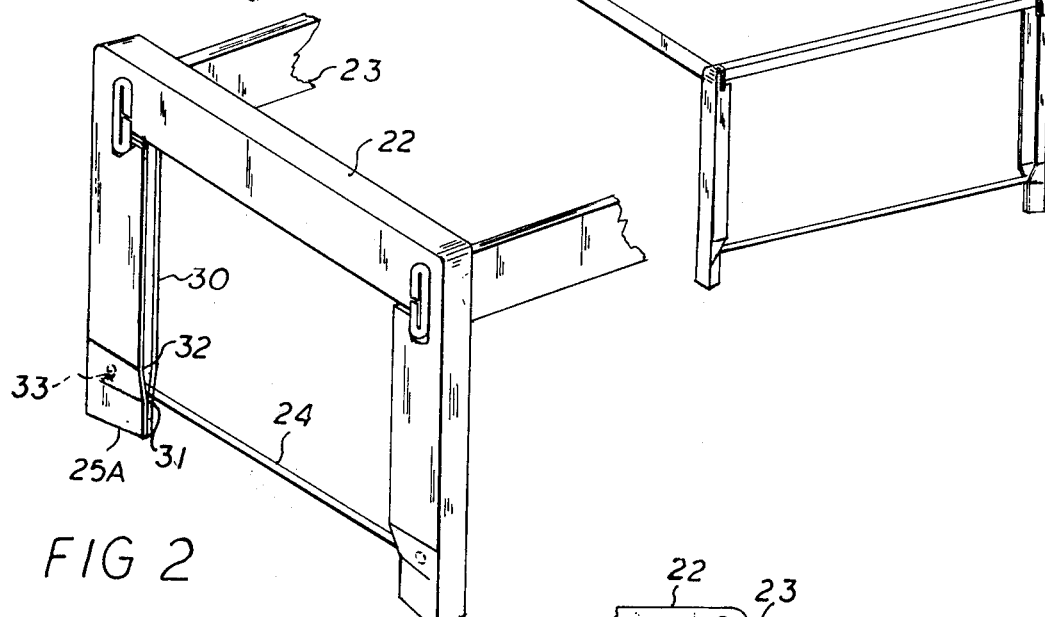
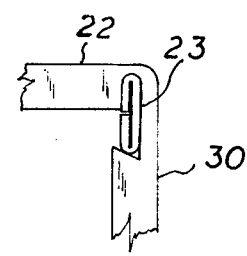

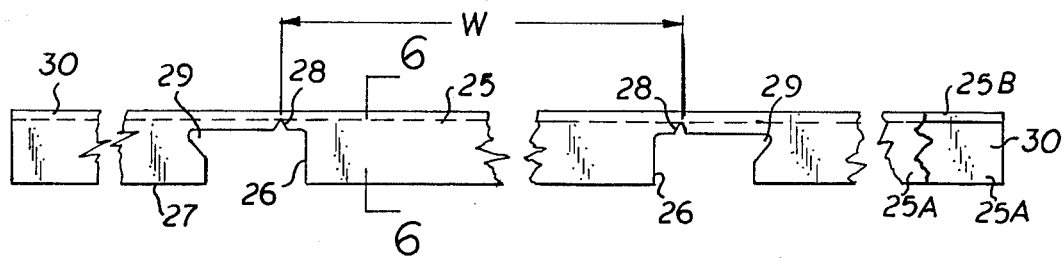
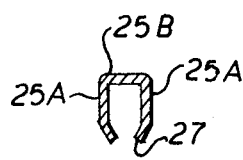
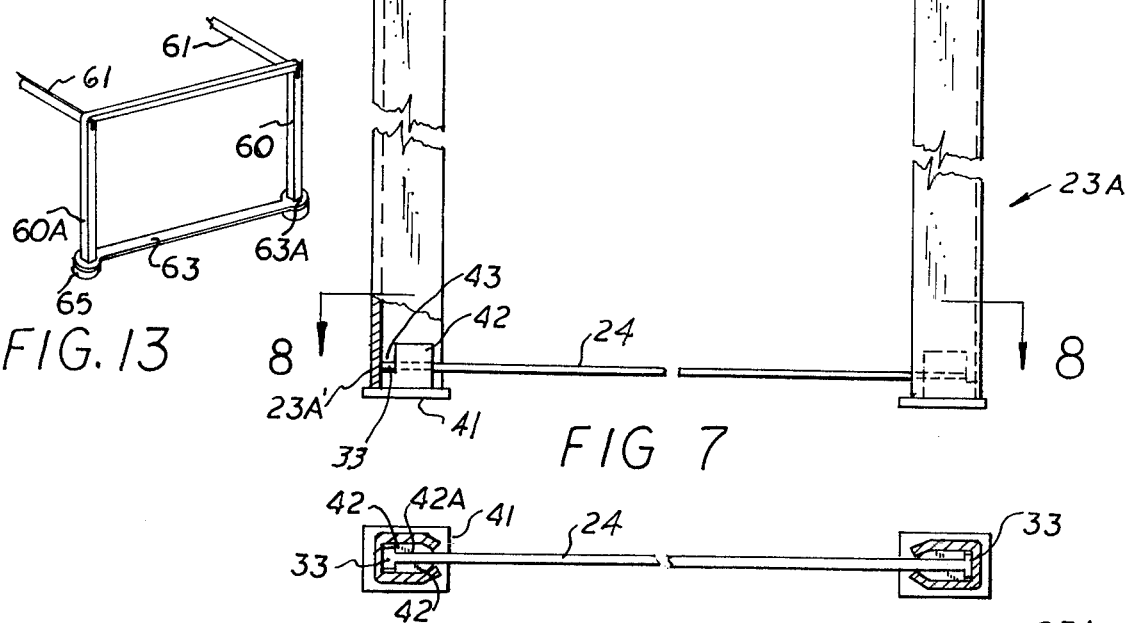
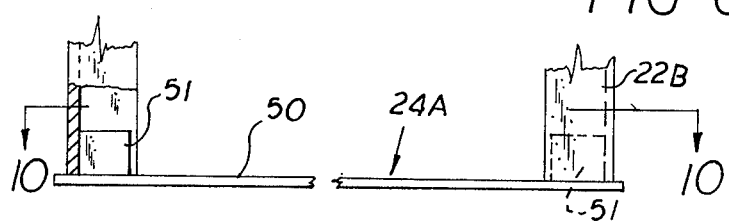
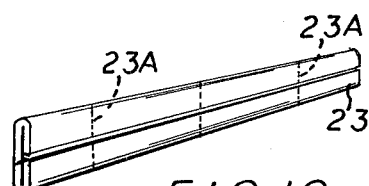
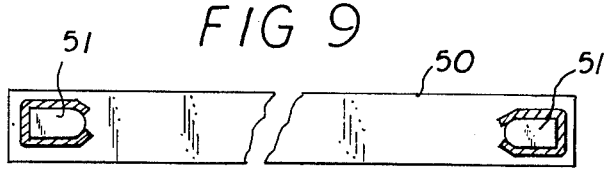
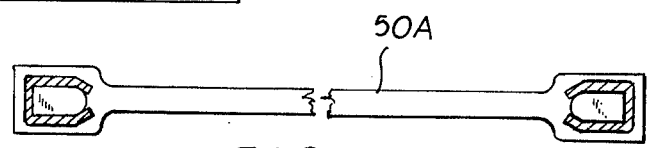

FRAME STRUCTURE AND METHOD OF MAKING SAME

This invention is directed to a supporting frame which is particularly adapted to be rendered readily assembled from a knock down position of dissembled elongated structural members which can be readily fabricated and economically shipped and/or stored into a stable, easily assembled, sturdy supporting frame.

Prior Art Structure.

Heretofore, there have been numerous known efforts to provide a supporting frame which can be readily assembled. However, each of the known efforts had inherent disadvantages. Some of the known efforts require the need and use of various hand tools to effect the assembly. Others require the need of various types of fastening devices to secure the respective component parts in the assembled position. Others required the use of preformed structural components which increased the manufacturing cost of such supporting frames, and/or which were difficult to pack and/or store. Others were relatively complicated and costly to manufacture and/or assemble. Still others were not rendered readily adjustable and could be made only in predetermined sizes over which the ultimate users could not adjust or vary, if so desired. The following cited U.S. Patent Specifications comprise the known patented art pertaining to supporting frames to which the instant invention relates: U.S. Pat. Nos. 2,336,802; 3,208,456; 3,266,496; 3,684,340; 3,788,718; 3,860,119; 3,913,995; 3,999,663; and 4,030,610.

OBJECTS

An object of this invention is to provide an improved supporting frame structure which can be readily assembled of relatively simply constructed structural members and which can be assembled without the need of any hand tools.

Another object is to provide a supporting frame which can be rendered adjustable in size so as to suit the needs of the ultimate user.

Another object is to provide a supporting frame and method of forming the same from relatively inexpensive structural members which when assembled forms a sturdy supporting frame structure.

Another object is to provide a supporting frame structure which requires no extraneous fastening devices to maintain the component parts in the assembled position.

Another object is to provide a frame support which can be readily shipped and/or compactly stored as simple elongated structural members which can be readily formed and assembled by the ultimate user.

SUMMARY OF THE INVENTION

The foregoing objects and other features of the invention are attained by a supporting frame and method for constructing the same which comprises component members which are formed of a plurality of essentially elongated or rectilinear structural members. At least a pair of such members are formed of readily bendable structural material. The bendable members are each formed with a peculiar notch construction, a pair of such notches being formed intermediate the length of its respective member. The notches are so formed and located so that the bending of the structural members is facilitated to define an inverted U-shaped end support; and when in the bent position, the notch defines a retainer for supporting the ends of the side rails for maintaining the opposed bent end supports in a rigid assembly. A cross piece is detachably connected between the opposed bent ends of the structural members for added rigidity. The respective side rails as formed with frangible portions at spaced intervals so that the ultimate user can determine the length of a particular assembled frame support.

The method of fabricating such frame support comprises the step of forming at least a pair of structural members which can be readily bent about a notch which is so formed that in the bent position, it defines an end support for the side rails. The method thus defines an expedient and economical manner for assembling a support frame without the need of any hand tool or extraneous fastening devices.

BRIEF DESCRIPTION OF THE DRAWINGS

FIG. 1 is a perspective view illustrating the support frame utilized as a hanging file frame in a file drawer.

FIG. 2 is a perspective view of a detail of construction.

FIG. 3 is an end view of a corner construction.

FIG. 4 is a perspective view of a modified support frame of the present invention in an assembled position.

FIG. 5 is a detail side view of a component part forming the end support prior to assembly.

FIG. 6 is a section view taken along line 6—6 on FIG. 5.

FIG. 7 is an end view of a modified support frame.

FIG. 8 is a section view taken along line 8—8 on FIG. 7.

FIG. 9 is a fragmentary end view of a modified constructional detail.

FIG. 10 is a sectional plan view taken along line 10—10 on FIG. 9.

FIG. 11 is a plan view of another modified construction.

FIG. 12 is a detail view of a side rail.

FIG. 13 is a partial perspective view of another modified embodiment.

DETAILED DESCRIPTION

Referring to the drawings, there is shown a supporting frame embodying the present invention. While the invention will be described for use as a hanging file support for use in a file drawer, it will be understood that the support frame has general utility as it can be used as a base support for such items as a table, platform, various items of furniture, scaffling and the like.

Referring specifically to FIG. 1 therein is shown a file drawer 20 in which there is disposed a support frame 21 embodying a form of the present invention. As shown, in FIG. 1, the frame 21 is in its assembled form and is utilized to support a plurality of hanging file folders 20A within the file drawer. The frame 21 is formed essentially of a pair of opposed end supports 22—22, a pair of side rails 23—23, and a pair of cross pieces 24—24. Essentially, the end supports 22—22, side rails 23—23 and cross-pieces 24—24 are formed of elongated structural members which are intended to be shipped and stored as elongated components in kit form so that they can be readily assembled by the ultimate consumer or user with the need of no tools or extraneous fastening devices.

As best seen in FIG. 5, the end support is initially fabricated as an elongated structural member 25 which is formed of a readily bendable material such as thin stock metal or plastic. In the illustrated embodiment, member 25 is formed from a channel shaped member having opposed side web portions 25a, 25a and an interconnecting web portion 25b. According to this invention, the respective side web portions 25a, 25a are each formed with a generally U-shaped notch 26, the notches in the respective web portions 25a, 25a being in alignment. The notches, 26, 26, are spaced apart intermediate the length of the respective members 25.

As best seen in FIG. 5, the notches 26 open to the free edge portion 27 of the respective side web portions 25a, 25a. Also, the free edges 27 of the channel member may be slightly, inwardly turned, as best seen in FIG. 6 for added strength. Along the back edge of the respective notches 26, there is a V-notch or groove 28. The V-groove defines a weakened portion about which the member 25 may be bent, as indicated in FIG. 1 or FIG. 7. The end of the notch 26 nearest the free end of the member 25 is provided with a lateral notch portion 29, which as will be hereinafter described, defines a seat for the side rail 23, in the assembled position. The arrangement is such that the interval between V-grooves 28—28 defines the width W of the end support 23. The extended end portions of the member beyond the notches 26 defines in the assembled position the leg portions 30 of the frame 21. Thus when member 25 is formed as herein described, it defines an inverted U-shaped end support 22.

The side rails 23 may be formed of a rigid stock material of a prescribed length. If desired, the side rails 23 may be provided with a series of scored lines or frangible points 23a whereby the user can adjust the side rail to a desired length by fracturing the side rail along a given frangible point 23a to establish the desired length. It will be understood that the frangible points 23a are so formed so as to facilitate the fracturing of the side rail transversely thereof, without effecting the longitudinal rigidity of the member 23. In the illustrated embodiment, the side rail is shown as a member having its opposed end prtions reversely bent to define an essentially double walled member. However, it will be understood that a bar stock may also be used to form the side rail 23.

Referring to FIGS. 2 and 7, it will be noted that member 25 is so formed that the leg portions are bent relative to the intermediate portion 25 between V-grooves 28, 28. In doing so, the edges of the notches 26 are formed about the end portions of the side rails so as to define a seat for snugly securing the end portions of the respective side rails 23 between the top portion 25T and the adjacent leg portion 30. In this manner, the side rails 23 function to securely connect the opposed end supports 22—22 in desired spaced relationship without the need of tools or extraneous fastening means. Thus, the notch 26 is so formed that upon the bending of member 25 as described, the side rails are securely fastened to the opposed end supports 22—22.

To prevent the leg portions from spreading apart under load, a cross piece 24 is interconnected between corresponding leg portions 30—30 of the end supports 22. In this form of the invention shown in FIG. 2, the lower leg portions are formed by inwardly pressing the side web portions 25a, 25a toward one another to define a pressed foot portion 31. In doing so, a V-shaped slot 32 is formed between web portions 25a, 25a. The cross-piece 24 is defined by a wire or rod having a cross head or pin 33 connected at its ends and which is received and secured in the V-slot 32 of the opposed foot portion 31.

With the frame 21 assembled as described, it can be readily placed in drawer 20 and used as a frame for hanging file folders 20A. In the construction described, it will be noted that the upper edges of the rails 23, 23 are smooth so that the files 20A may easily slide along the surface of rails 23.

FIG. 7 illustrates a modified frame structure 40. In this form of the invention, the structural member is channel shaped as hereinbefore described, and is different in that the foot portions are not inwardly pressed as described with respect to FIG. 2. In this form of the invention, as seen in FIG. 7, the end supports 23A are provided with a foot 41 which has a boss or projection 42 which is adapted to be snugly received in the lower end of the opposed leg portions. As best seen in FIGS. 7 and 8, the projection has a surface portion which is spaced from the interconnecting web portion 23A' to define a recess or slot 43. In this form of the invention, the cross head 33 of the cross piece 24 is received in slot 43, the projection 42 having a transverse slot 42A for accommodating the wire cross piece 24. In all other respects the frame 23A is similar to that described in FIGS. 1 and 2.

FIGS. 9 and 10 illustrate another modified construction. In this form of the invention the end support 22B is identical to that described with respect to end support of FIG. 7. However, in this form of the invention, the cross piece 24A has been modified. As shown in FIGS. 9 and 10, the cross piece 24A comprises a strap 50 having connected adjacent the ends thereof a boss or projection 51 which is adapted to be frictionally received in the end of the respective leg portions of the end support. Thus the strap 50 defines the base upon which the end supports are seated in a file drawer when used as a hanging file support.

The embodiment of FIG. 11 is similar to that of FIGS. 9 and 10, except that the strap 50A is formed of a reduced width.

FIG. 13 illustrates a further embodiment. In this form of the invention, the end supports 60—60 and side rails 61—61 are similar to that described with respect to FIG. 7. However, in this form of the invention, the cross piece 63 is defined as a strap having an eye type opening 63a formed in the end portion thereof arranged to receive the foot portion 60a of the end supports. A foot piece 65 having a projection is inserted into the end of the respective leg portions to retain the strap 63 on the respective legs. In all other respects the frame of FIG. 13 is similar to that hereinbefore described.

From the foregoing, it will be noted that the frame has particular application for a hanging file, but is may also be utilized for other purposes as hereinbefore set forth.

According to this invention, the method for constructing a support frame including forming a pair of readily bendable structural members with a pair of spaced apart notches intermediate the length thereof where the notch is formed so that the member can be readily bent thereat, and when bent normal to an intermediate portion defines a seat for frictionally securing thereto the end portions of a side rail. A cross piece is then connected between the opposed leg portions of an end support to prohibit the spreading of the leg members under aloaded or stressed condition. The notch is formed so as to be open to one edge of its member, and includes a transverse notch to facilitate bending of the end support member and a longitudinal or lateral notch to define a seat for the side rail in the assembled position.

While the invention has been described with respect to a particular embodiment thereof, it will be readily appreciated and understood that variations and modifications may be made without departing from the scope or spirit of the invention.

What is claimed is:

1. A frame support adapted to be readily assembled between a knock down position and an assembled operative position comprising:

a pair of similarly formed elongated members formed of a structural readily bendable material when in the knock down position and bent to define a generally inverted U-shaped end support in the assembled position of said frame, each of said members having a generally U-shaped notch located in spaced apart intervals intermediate the length thereof, whereby the distance between said notches determines the width of the end support in the assembled position, said notches being opened to one side of said members, a pair of opposed side rails of a predetermined length, and means about which said member is bent whereby said notch defines an end grip for said side rails extended between said end supports in the assembled position.

2. A frame support as defined in claim 1 and wherein said generally U-shaped end supports include a pair of opposed leg portions, and a cross piece detachably secured between the leg portions of the respective end supports.

3. A frame support as defined in claim 1 wherein each of said elongated members comprise a channel shaped structural member having opposite side web portions and an interconnecting web portion, and said notches being formed in alignment in the respective side web portions of the respective channel shaped structural members.

4. A frame support as defined in claim 3 wherein said notches encompass the end portion of the side rails to confine and lock said end portions at the corners of said end supports.

5. A frame support as defined in claim 3 wherein the side web portions of said channel shaped structural members are inwardly compressed to define a foot portion for said end supports, and said cross piece being detachably connected between said opposed foot portions of the end supports;

said cross piece having a cross head disposed at the ends of said cross piece whereby said cross head is frictionally held in place by the inwardly compressed side web portions.

6. A frame support as defined in claim 4 wherein said cross piece comprises a strap extended between the leg portions of said end supports.

7. A frame support as defined in claim 4 and including a foot adapted to be received in the respective end of said leg portions of said end supports, said foot having a portion projecting into said leg portions between said side web portions, and said projection being spaced from the interconnecting web portion, and said cross piece having a cross head disposed at the ends thereof, said cross head being detachably secured in the space between said interconnecting web and said foot projection.

8. A frame support as defined in claim 4 wherein said cross piece comprises a strap, said strap having a foot projection connected to the ends of said strap, said foot projection being inserted into the leg portions of said end supports.

9. A support frame as defined in claim 1 and a file drawer, said frame support being adapted to be received in said file drawer, said frame support being adapted for use as a hanging file frame.

10. A support frame as defined in claim 1 wherein said U-shaped notch includes a lateral extending cut-out extended longitudinally of said structure member to define a recess for accommodating said side rail.

11. A support frame as defined in claim 10 wherein said U-shaped notch includes a V-groove intermediate the ends thereof whereby said V-groove defines the bend line for said structural member.

12. A method of constructing a supporting frame comprising the steps of:

forming a pair of spaced apart notches intermediate to the ends of an elongated structural member whereby said notches open to one edge of said structural member, forming a pair of elongated side rails of predetermined length, positioning the ends of said side rails in the notches of said structural members whereby said notches define a retainer opening for supporting the end of said side rails, and bending each of said notched structural members whereby the ends of said side rails in said notches are disposed normal to the length of the structural member disposed between said notches whereby said notches in the bent position frictionally secures the ends of said side rails to said bent structural members.

13. A method as defined in claim 20 and including the step for forming a cross piece, and detachably securing the cross piece between the opposed bent extended end portions of said bent structural members.

14. A frame comprising:

a pair of similarly formed elongated members, each of which is formed of a structurally readily bendable material to define an inverted U-shaped end support in the assembled position of said frame, each of said elongated members having at least one side web portion and a laterally disposed connected web portion, each of said members having a pair of generally U shaped notches located in said side web portion at spaced apart intervals intermediate the length thereof, whereby the distance between said pair of notches determines the width of the end support in the assembled position, said notches being opened to one edge of said side web portion, a pair of opposed side rails of a predetermined length, said side rails having an end portion with a width adapted to be received within said notch, said elongated members being bendable about said end portion of said side rail disposed in said notch whereby said bend frictionally binds said end portion in said notch to said bent elongated member in the assembled position of said frame.

15. A support frame as defined in claim 14 wherein each of said elongated members formed of a bendable material comprises a member having opposed side web portions interconnected by a web portion, each of said side web portions having spaced apart notches formed therein whereby said notches formed in said opposed web side portions being disposed in alignment.

16. A support frame as defined in claim 14 and including a cross piece extended between the opposed extended ends of said elongated members in the bent position thereof.

17. A support frame as defined in claim 15 wherein the side web portions adjacent to the ends of said elongated members are inwardly pressed to pinch said side web portions, and a cross piece extended between the opposed ends of said elongated members in the bent position thereof; said cross piece having its respective end portions supported at said pressed side web portions.

* * * * *